United States Patent Office 2,855,777
Patented Oct. 14, 1958

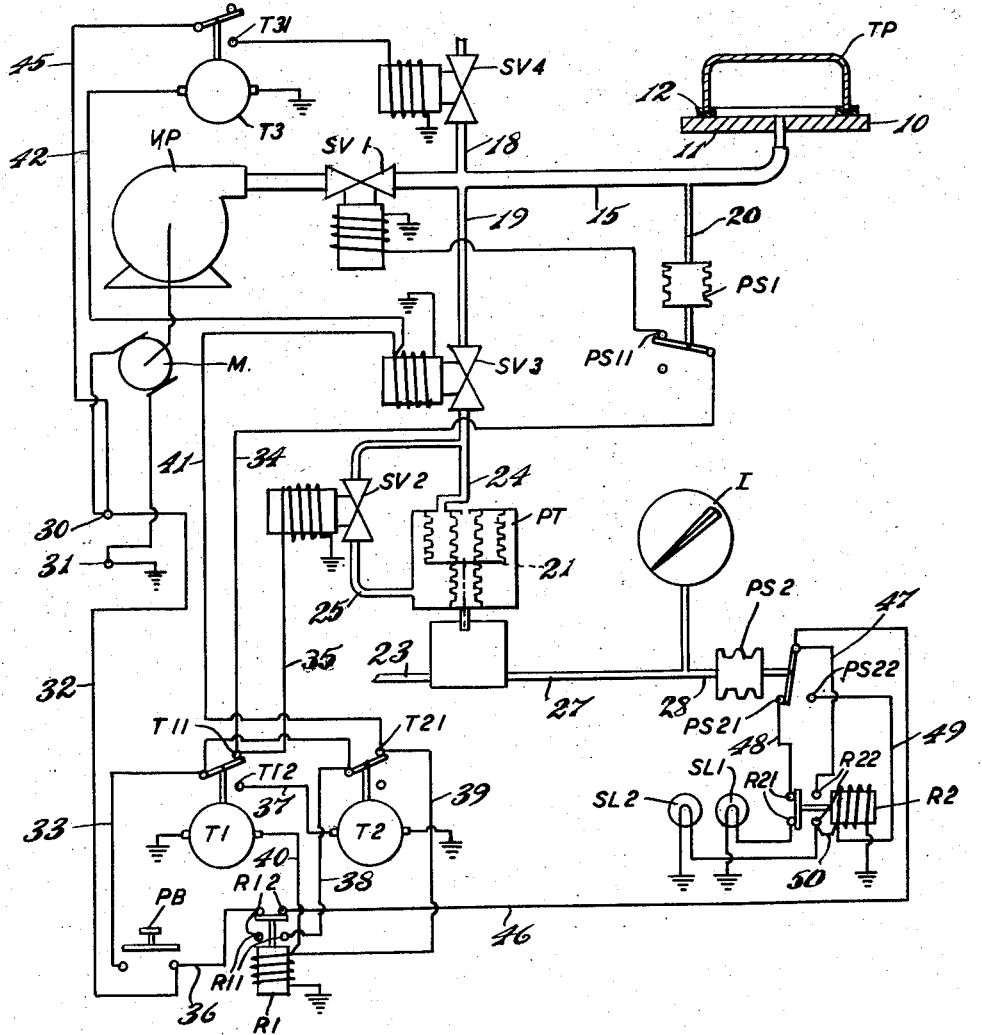

2,855,777

VACUUM LEAK TESTING APPARATUS

Harry Sherid Garrett, Feasterville, Pa., assignor to Moore Products Co., Philadelphia, Pa., a corporation of Pennsylvania Application February 3, 1956, Serial No. 563,275

9 Claims. (Cl. 73—40)

This invention relates to vacuum leak testing apparatus.

It has heretofore been proposed to apply pressure to a test piece to determine the leakage by the use of fluid under pressure. This procedure had various disadvantageous characteristics.

In accordance with the present invention a vacuum is employed for the purpose of testing the leakage of a test piece.

In accordance with the present invention, also, by the employment of a vacuum for leakage testing, the effect of thermal changes is substantially eliminated because of the absence of air within the system to respond to thermal changes.

In accordance with the present invention, also, it is possible to test parts with large interior volumes or with poor thermal conductivity at a greater rate than is possible with pressure type systems.

In accordance with the present invention, also, pieces may be tested which are at other than room temperatures in a manner which is not ordinarily possible with pressure testing systems.

In accordance with the present invention, also, provision is made for indicating a departure from a predetermined permitted leakage over a predetermined time interval and obtaining and retaining an indication of such departure.

Other objects and advantageous features will be apparent from the specification and claims.

The nature and characteristic features of the invention will be more readily understood from the following description, taken in connection with the accompanying drawings forming part thereof, in which the figure is a simplified schematic diagram of a vacuum leak testing apparatus in accordance with the present invention and showing the pneumatic components and the interconnection of the electrical components.

It should, of course, be understood that the description and drawings herein are illustrative merely, and that various modifications and changes may be made in the structure disclosed without departing from the spirit of the invention.

Referring now more particularly to the drawings, a test fixture is shown at 10 which may be in the form of a plate 11 or the like with a gasket 12 thereon having a suitable shape for the reception of a hollow test piece TP whose leakage is to be tested.

The plate 11, within the confines of the gasket 12, has a fluid connection 15 in communication therewith. The fluid connection 15 is connected to a vacuum pump VP, the vacuum pump VP preferably being actuated by an electric motor M connected thereto.

Interposed in the fluid connection 15, between the plate 11 and the pump VP, a solenoid operated valve SV1 is provided for shutting off the communication of the fluid connection 15 with the vacuum pump VP and thereby isolating the test fixture 10 for purposes which will hereafter become apparent.

The fluid connection 15 has connected thereto a fluid connection 18 which is in communication with the atmosphere, to provide a vent to the atmosphere. The fluid connection 18 has a solenoid operated valve SV4 therein to control the venting.

The fluid connection 15 also has a fluid connection 19 connected thereto in which a solenoid operated valve SV3 is provided, also for isolating purposes.

Interposed between the test fixture 10 and the fluid connection 19, a fluid connection 20 is provided, in communication with a fluid pressure operated switch PS1, which is responsive, as hereinafter explained, to a predetermined low level of pressure in the fluid connection 15.

A pressure transmitter PT for transmitting a pressure responsive to a differential of pressures applied therein is provided and may be of any desired type, one suitable pressure transmitter being shown in the prior patent of C. B. Moore, No. 2,312,201.

The pressure transmitter PT has a fluid connection 23 connected thereto, the fluid connection 23 being in communication with any suitable source of fluid, such as air, under pressure.

The pressure transmitter PT has a pressure responsive member 21 therein, responsive to differential pressures, and to one side a fluid connection 24 in communication with the fluid connection 19 is connected. The other side of the pressure responsive member has a fluid connection 25 in communication therewith and with the junction of the fluid connections 19 and 24. A solenoid operated valve SV2 is interposed in the fluid connection 25 to seal off the part of the fluid connection which is in communication with the other side of the member 21.

The pressure transmitter PT has a fluid pressure transmitting fluid connection 27 connected thereto and to any suitable pressure responsive visual indicator I, such as an indicating dial type pressure gauge, and has a fluid connection 28 in communication therewith which is connected to a fluid pressure responsive switch PS2, the switch PS2 being responsive to a predetermined pressure level.

The electric circuit connections include power leads 30 and 31 connected to any suitable source of alternating current supply, the lead 31 being connected to ground.

The motor M is connected to the power leads 30 and 31 for continuous operation. The pressure operated switch PS1 has a normally closed contact PS11 and the pressure operated switch PS2 has a normally closed contact PS21 and a normally open contact PS22.

An adjustable electric motor operated timer T1 is provided which has a normally closed contact T11, and a normally open contact T12, and an adjustable electric motor operated timer T2 is provided, having a normally closed contact T21.

A control relay R1 is provided, for effecting a holding action, and has normally open contacts R11 and normally closed contacts R12, and a control relay R2, also for effecting a holding action is provided, and has normally closed contacts R21 and normally open contacts R22.

In order to initiate controlled operation, a manually operable push button PB is connected by a conductor 32 to the power lead 30 and from which a conductor 33 extends to the movable contact arm for the contact T11. A conductor 34, connected to the contact T11 and in which the contact PS11 is provided, extends to the winding of the solenoid valve SV1 and thence to ground.

A conductor 35 connected to the contact T11 extends to the winding of the solenoid valve SV2, and thence to ground.

A conductor 36 is connected to one of each of contacts R11 and R12 from the conductor 32. A conductor 37 is also connected from the contact T12 through the timer T2 and thence to ground. The other of the contacts R11 is connected by a conductor 38 to the conductor 33 with a connection to the armature for the contact T21. A conductor 39 is provided, connected to the contact T21, and extends to the winding of the relay R1 and thence to ground and a conductor 40 connected thereto and to the timer T1 and thence to ground.

The contact T21 has a conductor 41 connected thereto which extends to the winding of the solenoid valve SV3 and thence to ground and the conductor 41 has a conductor 42 connected thereto and thence through the timer T3 to ground.

The power lead 30 has a conductor 45 connected thereto, in which the contact T31 is provided, and which extends through the winding of the solenoid valve SV4 and thence to ground. The other contact R12 has a conductor 46 connected thereto and the conductor 46 extends to the movable contact arm of the pressure switch PS2. A conductor 47 is connected to the conductor 46 and extends through the contacts R22 and a signal or indicator lamp SL2 to ground. The signal lamp SL2 may be of any desired character, but for purposes of indication is preferably red in color. The contact PS21 has a conductor 48 connected thereto which extends through the contacts R21 and a signal or indicator lamp SL1 to ground. The signal lamp SL1 may be of any desired character but for purposes of indication is preferably green in color.

The contact PS22 has a conductor 49 connected thereto which extends to the winding of the relay R2 and from thence to ground, with a connection 50 to the contact R22 which is connected by the conductor 47 to the signal lamp SL2.

The mode of operation will now be pointed out.

With power supplied to the power leads 30 and 31, the motor M is continuously operated to actuate the vacuum pump VP to provide a vacuum in the fluid connection 15.

The operator places the test piece TP on the test fixture plate 11 and in engagement with the gasket 12 so that the interior of the test piece TP is isolated from the atmosphere. The operator then presses the push button PB. This energizes the windings of the solenoid valves SV1, SV2 and SV3 and opens these valves.

The circuit for energization of the winding of the solenoid valve SV1 may be traced as follows: From the conductor 32 through the closed contacts of the push button PB, the conductor 33 and the normally closed contacts T11, the conductor 34 and the normally closed contacts PS11, the winding of the solenoid valve SV1 and thence to ground. At the same time with the contacts T11 closed, a circuit is established through the conductor 35 and the winding of the valve SV2.

A circuit is also set up through the conductor 38 and the normally closed contacts T21, the conductor 39 and the winding of the relay R1, which closes the contacts R11 so that the push button PB can be released.

A circuit is also similarly set up through the conductor 42 and the winding of the timer T3, causing the contact T31 to be closed and energizing the winding of the solenoid valve SV4 to close the valve SV4 at this time. The motor of the timer T1 is also energized by a similar circuit.

The continuous operation of the vacuum pump VP causes the evacuation of air from the interior of the test piece TP, through the fluid connection 15, and, through the fluid connections 19, 24 and 25, both sides of the pressure responsive member of the pressure transmitter PT have the air evacuated therefrom.

While any desired vacuum may be employed, it is preferred that the evacuation be effected to approximately 28 inches of mercury, or 1 p. s. i. absolute.

When the desired low pressure level has been effected, the pressure switch PS1 is effective to open its contact PS11, thus to deenergize the winding of the solenoid valve SV1 so that that valve SV1 closes. The pumping phase of the cycle is thus terminated and after a short time interval the pressures on both sides of the differential pressure transmitter PT and in the interior of the test piece are equalized, whereupon the timer T1, previously set for the desired time interval, is effective to open its contact T11 and close its contact T12. This deenergizes the winding of the solenoid valve SV2 so that the valve SV2 closes and at the same time the closing of the contact T12 starts the motor of the timer T2.

With the solenoid valve SV2 closed, any leakage into the test piece TP from the exterior will raise the pressure on one side of the differential pressure transmitter PT through the fluid connections 15, 19 and 24, but will not affect the pressure on the other side of the differential pressure transmitter PT, which is isolated by the solenoid valve SV2.

The differential pressure transmitter PT transmits to the fluid connection 27, from its supply connection 23, an amplified output which is proportional to the pressure across the differential pressure transmitter PT, as available, through the connections 24 and 25. The output pressure, in turn, actuates the indicator I to provide a visual indication of the amount of leakage and, also, if the pressure attendant upon the leakage exceeds a predetermined tolerance limit within a predetermined period of time, determined by the setting of the timer T2, is effective to actuate the pressure switch PS2.

At the end of the time limit determined by the timer T2, the timer T2 opens its contact T21, thereby immediately deenergizing the winding of the solenoid valve SV3, so that the valve SV3 closes, to seal the existing pressure within the differential pressure transmitter PT and maintain whatever reading is shown on the indicator I until the next test cycle is initiated.

The opening of the timer contact T21 also deenergizes the winding of the timing relay T3, and, after a very short delay, its contact T31 opens to deenergize the winding of the solenoid valve SV4 and open the valve SV4 for venting to the atmosphere. Atmospheric air enters through the fluid connection 18 and, by the fluid connection 15, enters the interior of the test piece TP so that it may be removed from the test fixture 10.

The opening of the timer contact T21 also deenergizes the winding of the relay R1 so that its contact R11 is opened and its contact R12 is closed. If, by the time this occurs, the leakage has been less than the tolerance limit, the pressure operated switch PS2 will not have been actuated and the signal lamp SL1 will be energized through the normally closed contact PS21 of the pressure switch PS2 and through the normally closed relay contact R21.

If, on the other hand, the leakage was sufficient to build up sufficient pressure in the connections 27 and 28 to actuate the pressure switch PS2, this will cause the contact PS22 to close, so that the signal lamp SL2 is energized. The relay R2 locks the energization of the signal lamp SL2 by its contact R22, and by its contact R21 locks out and prevents energization of the signal lamp SL1.

The opening of the contact R11 completely deenergizes the primary control circuit and permits both timers T1 and T2 to reset to their initial positions, thus terminating the cycle. The operator may then remove the test piece and employ the apparatus for sequentially testing additional pieces, as previously described.

The vacuum effective, as heretofore pointed out, in the interior of the test piece TP permits of self sealing with the test piece TP held against the gasket 12. No clamping device is required as soon as the interior of the test piece TP has been evacuated.

The removal of air by the use of the vacuum pump VP also eliminates the effect of thermal changes during the test cycle so that testing pieces TP with large interior volumes or with poor thermal conductivity can be tested at a rapid rate.

Test pieces at temperatures other than room temperature may also be tested.

I claim:

1. Leak test apparatus comprising a work piece receiving device, said device having a work engaging portion, a fluid connection to a source of vacuum in communication with said device and interiorly of said portion, a fluid pressure transmitter, a fluid supply connection connected to said pressure transmitter from a source of fluid under pressure, said pressure transmitter having a fluid pressure transmitting connection and a portion responsive to a pressure differential, said last portion having opposite sides for the application of fluid pressure thereagainst, conduit means in communication with said vacuum connection for applying the pressure in said vacuum connection at said opposite sides, a cutoff valve for isolating said opposite sides from each other, and pressure responsive means responsive to the pressure in said pressure transmitting connection.

2. Leak test apparatus as defined in claim 1 in which said pressure responsive means includes an indicating member responsive to the pressure transmitted by said pressure transmitting member, and holding means interposed between said first mentioned fluid connection and said indicating member is provided for retaining the condition of said indicating member.

3. Leak testing apparatus as defined in claim 1 in which said fluid pressure responsive means includes a pressure actuated electric control member.

4. Leak test apparatus comprising a work piece receiving device, said device having a work engaging portion, a fluid connection to a source of vacuum in communication with said device and interiorly of said portion, a fluid pressure transmitter, a fluid supply connection connected to said pressure transmitter from a source of fluid under pressure, said pressure transmitter having a fluid pressure transmitting connection and a portion responsive to a pressure differential, said last portion having opposite sides for the application of fluid pressure thereagainst, conduit means in communication with said vacuum connection for applying the pressure in said vacuum connection at said opposite sides, a cutoff valve for isolating said opposite sides from each other, and fluid pressure responsive means including an indicating member responsive to the pressure in said fluid pressure transmitting connection.

5. Leak test apparatus comprising a work piece receiving device, said device having a work engaging portion, a fluid connection to a source of vacuum in communication with said device and interiorly of said portion, a fluid pressure transmitter, a fluid supply connection to said pressure transmitter from a source of fluid under pressure, said pressure transmitter having a fluid pressure transmitting connection and a portion responsive to a pressure differential, said responsive portion having opposite sides for the application of fluid pressure thereagainst, conduit means in communication with said vacuum connection for applying the pressure in said vacuum connection at said opposite sides, a cutoff valve for isolating said pressure transmitter from said vacuum connection, a cutoff valve for isolating said different parts, and fluid pressure responsive means responsive to the fluid pressure in said fluid pressure transmitting connection.

6. Leak test apparatus as defined in claim 5 in which timers are provided, and said timers have connections for actuating said cutoff valves in timed relation.

7. Leak testing apparatus comprising a work piece receiving device, said device having a work engaging portion, a fluid connection to a source of vacuum in communication with said device and interiorly of said portion, a control valve member interposed in said vacuum connection for isolating said receiving member from said source of vacuum, a vent connection in communication with said vacuum connection, a control member for controlling said vent connection, a fluid pressure transmitter having a supply connection to a source of fluid under pressure and a fluid pressure transmitting connection, said fluid pressure transmitter having a pressure responsive portion responsive to fluid upon separated parts thereof, a fluid connection from said vacuum connection to said pressure transmitter, said last fluid connection having a branched connection in communication with said separated parts, a member for sealing off one part of said branched connection, and a fluid pressure responsive member with which said pressure transmitting connection is in communication for the application of the transmitted pressure thereagainst.

8. Leak testing apparatus as defined in claim 7 in which said last fluid connection has a control valve interposed therein for sealing within said branched connection fluid pressure applied to said branched connection.

9. Leak testing apparatus comprising a work piece receiving device, said device having a work engaging portion, a fluid connection to a source of vacuum in communication with said device and interiorly of said portion, an amplifying fluid pressure transmitter, a supply connection from a source of fluid under pressure to said pressure transmitter, said pressure transmitter having a fluid pressure transmitting connection and a portion responsive to a pressure differential, conduit means in communication with said vacuum connection for applying the pressure in said vacuum connection at said responsive portion, and fluid pressure responsive means responsive to the pressure in said pressure transmitting connection.

References Cited in the file of this patent

UNITED STATES PATENTS

| | | |
|---|---|---|
| 1,933,322 | Fagan | Oct. 31, 1933 |
| 2,352,916 | Schrader | July 4, 1944 |
| 2,533,712 | Campbell | Dec. 12, 1950 |
| 2,679,747 | Andrus | June 1, 1954 |
| 2,707,390 | Beretish | May 3, 1955 |